(No Model.) 2 Sheets—Sheet 1.
O. ANDERSON.
BAND CUTTER AND FEEDER.
No. 359,487. Patented Mar. 15, 1887.
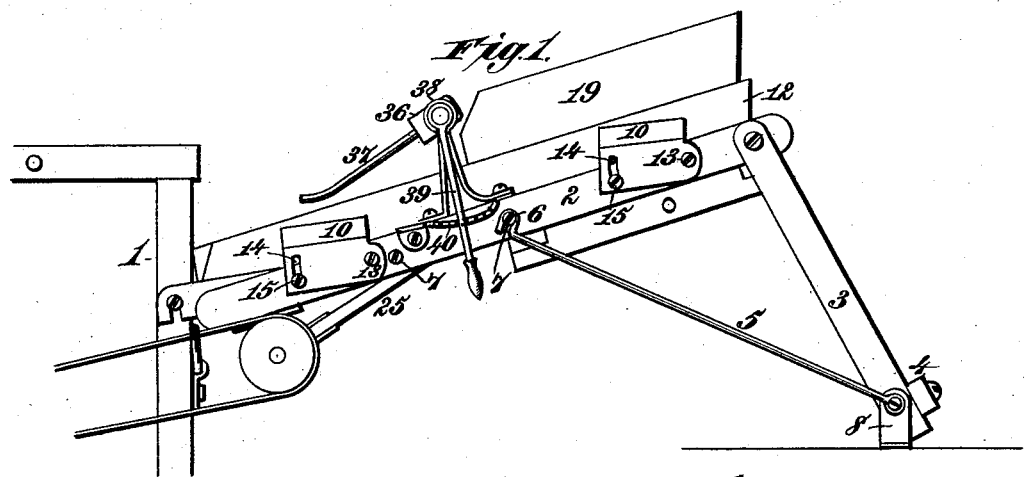
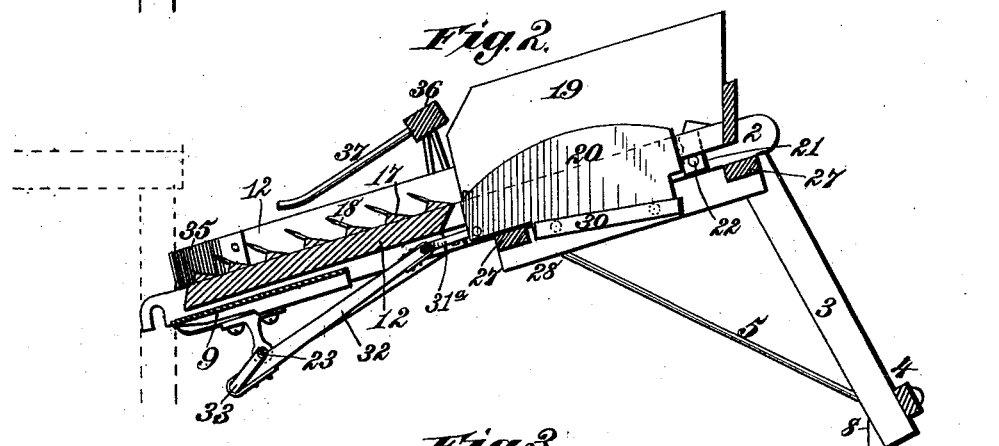
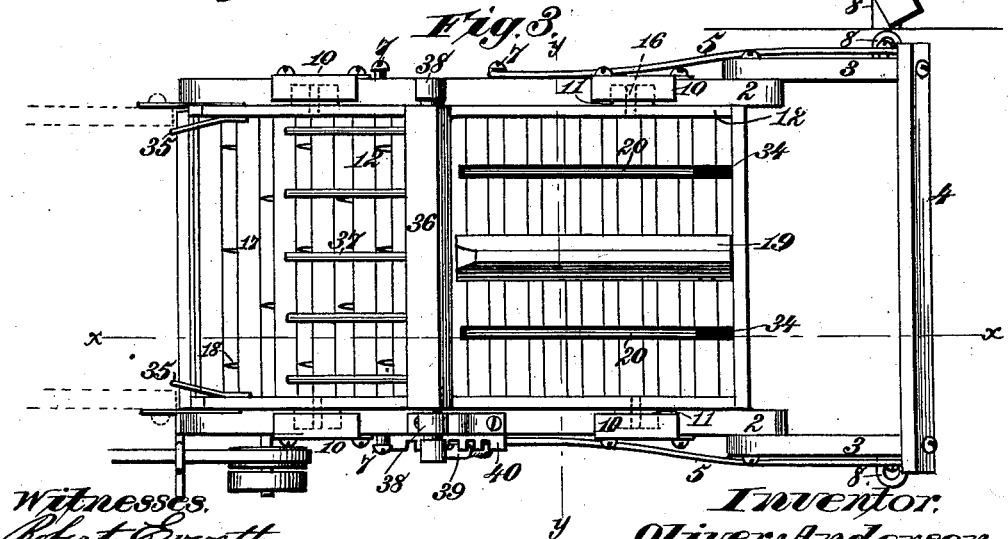
Witnesses:
Robert Everett,
Dennis Sumby.
Inventor:
Oliver Anderson.
By James L. Norris,
Atty.

(No Model.) 2 Sheets—Sheet 2.
O. ANDERSON.
BAND CUTTER AND FEEDER.
No. 359,487. Patented Mar. 15, 1887.
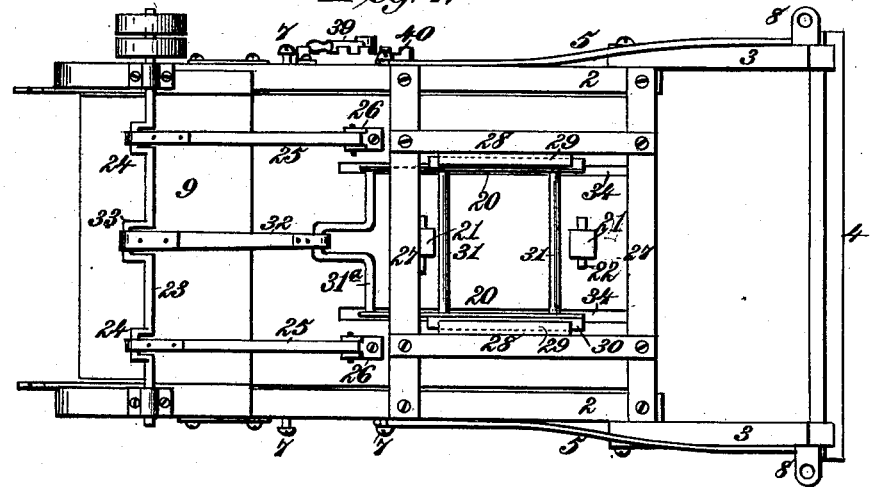

UNITED STATES PATENT OFFICE.

OLIVER ANDERSON, OF FORT TOTTEN, DAKOTA TERRITORY, ASSIGNOR OF ONE-FIFTH TO LOUIS SWANSON, OF SAME PLACE.

BAND-CUTTER AND FEEDER.

SPECIFICATION forming part of Letters Patent No. 359,487, dated March 15, 1887.

Application filed April 1, 1886. Serial No. 197,445. (No model.)

*To all whom it may concern:*

Be it known that I, OLIVER ANDERSON, a citizen of the United States, residing at Fort Totten, in the county of Ramsey and Territory of Dakota, have invented new and useful Improvements in Band-Cutters and Feeders, of which the following is a specification.

This invention has for its object to provide novel and efficient mechanism for cutting the bands of bundles of grain and uniformly feeding the latter to the cylinder and concave of a thrashing-machine.

The object of my invention I accomplish in the manner and by the combination of devices hereinafter described and claimed, reference being made to the accompanying drawings, in which—

Figure 1 is a side elevation of a band-cutter and feeder embodying my invention and connected with the rear end portion of a thrashing-machine; Fig. 2, a longitudinal sectional view taken on the line $x\,x$, Fig. 3; Fig. 3, a top or plan view of the feeder; Fig. 4, a bottom plan view of the same; Fig. 5, a transverse sectional view taken on the line $y\,y$, Fig. 3; Fig. 6, a detached side elevation of the partition; Fig. 7, a detail perspective view of one of the slides and its pivot pin or bolt.

The numeral 1 designates a portion of the framing at one end of a thrashing-machine, and 2 indicates the side bars or frame of the band-cutter and feeder, having hooked or other extensions to connect with the thrasher, the other end of the feeder-frame 2 being adjustably supported by pivoted legs 3, which are connected by a cross-bar, 4, and provided with pivoted side braces, 5. These braces are pivoted near the lower extremities of the legs, and at their other or upper ends are provided with slots or hooks 6, that are capable of engaging staples or pins 7, placed at intervals along the side bars, 2, thus permitting the legs to be adjusted and secured at any angle, and thereby impart to the feeder any desired inclination. The lower ends of the legs are provided with pivoted castings 8, having holes through which stakes can be driven to hold the feeder-frame fast while in use.

On the side bars are arranged slide-rests 10 for receiving slides 11, attached to the sides of a reciprocating or vibrating table, 12, that feeds the grain and straw to the thrasher. The slide-rests are each pivoted at one end, as at 13, and have at the other end a vertical slot, 14, and a set-screw, 15, by which they can be set at any inclination desired; and the slides 11 are attached to the sides of the table by pivot pins or bolts 16, on which the slides can turn or swing, so that they will assume any angle to which the slide-rests are adjusted.

The reciprocating or vibrating feed-table is provided with a series of transverse slats, 17, triangular in cross-section, and arranged with their vertical sides toward the thrasher. This form and arrangement of slats permits the straw to pass readily over their inclined tops, and then as the table vibrates the vertical sides of the slats push the straw rearward and toward the thrashing-machine. The slats are shown as provided with teeth 18, projecting upward and toward the thrasher to facilitate the feeding of the straw to the thrasher.

The upper or forward portion of the vibratory table is provided with a vertical central partition, 19, extending in the direction of the length of the table, and on each side of this partition is arranged a longitudinal knife or cutter-blade, 20, for severing the bands of the sheaves as they are fed over the vibrating table at opposite sides of the partition.

The partition is provided at its lower edge with pendent legs 21, passing through the table, and these legs are held by keys 22 or otherwise, so that the partition can be readily detached should it be desirable to feed loose or unbound grain to the thrasher. A rotary shaft, 23, is journaled to the lower edges of the side bars, 2, and such shaft is provided with two cranks, 24, connected by pitmen 25 with brackets 26, secured to the under side of the table, whereby the latter is reciprocated.

To the under side of the table are attached two cross-bars, 27, carrying two longitudinal parallel bars, 28, having at their inner sides grooved guideways 29, in which are adapted to move the slides 30, said slides being rigidly connected by the rods 31. To the rear ends of the knives is secured a cranked rod, 31$^{\mathrm{a}}$, to which is secured a pitman, 32, which is connected with a crank, 33, provided on the shaft 23 centrally between the cranks 24. The cutters or knives 20 are rigidly secured, respectively, to the slides 30, and project vertically through longitudinal slots 34 in the vibratory table, all in such manner that as the table is moved by the cranks 24 and pitman 25 the knives or cutters are also reciprocated in the same direction by the crank 33 and pitman 32. The central crank being longer than the others, the knives or cutters have a longer range of movement than the table, and besides the knives are reciprocated at a somewhat greater speed than the table, which is very important in order to efficiently sever the bands which secure the grain in bundles.

The grooved guideways of the slides 30 are so inclined with relation to the table that the slides gradually rise as they move toward the delivery end of the table and fall as they move toward the receiving end thereof, and consequently the knives or cutters are correspondingly raised and lowered, thereby effectively cutting the bands by movements resembling a shear-cut. The falling movement of the knives or blades, when receding, to a great extent avoids interference with the advance of the grain to the separator. The grooved guideways 29 may be rendered adjustable the same as the side rests, 10, for the purpose of inclining them more or less, and thereby varying the rising and falling movements of the knives.

I wish it to be understood that the partition may be omitted, and a single knife may be employed instead of two or more, if desired.

At the end of the vibratory feed-table nearest the thrasher are guides 35, to direct the straw properly and prevent its being forced out at the sides.

Extending across the feeder adjacent to the thrasher is an adjustable shaft or bar, 36, carrying a number of long fingers, 37, which extend toward the thrasher. The shaft 36 is journaled in bearings 38 on the side bars, 2, of the feeder-frame, and at one end of this shaft is a pawl or catch, 39, for engaging a rack, 40, on one of the side bars. The shaft is thus adjustable to cause the fingers to press more or less firmly upon the grain or straw, and thereby regulate its feed to the thrasher.

In operating the machine the sheaves are thrown upon the vibratory table on each side of the longitudinal partition with the heads of the grain toward the separator. The vibratory motion of the feed-table and the inertia of the sheaves in conjunction with the described movements of the knives or cutters will cause the latter to sever the bands, and by reason of the cross-slats and the teeth the grain will be gradually and uniformly advanced toward the thrasher. The finger-bar or shaft, by being adjusted to cause the fingers to bear with greater or less force on the grain, will regulate the rapidity of the feed by governing the travel of the grain. If the feed is not sufficiently rapid or the movement of the vibratory feeder does not carry the grain with sufficient speed toward the thrasher, the elevation of the free end of the feeder may be increased by drawing the legs 3 to a vertical or nearly vertical position, so as to give a greater inclination to the table, and a faster feed may also be secured by lowering the slotted ends of the several slide-rests.

It will of course be obvious that while the table is reciprocating it is also raised and lowered through the medium of the slide-rests 10 and the slides 11, thereby imparting such vibratory movements to the table as will produce the best results.

When it is desired to move the thrasher, the side bars, 2, can be detached, and also the braces 5 at the points where they are connected to said bars, the legs 3 being thus permitted to fold beneath the table and out of the way.

To the ends of the side bars, 2, where they are connected with the thrasher, is arranged an apron, 9, which serves to conduct the grain to the thrasher and prevent it from falling down between the feeder and the thrasher as the feed-table reciprocates.

It will be observed that this band-cutter and feeder is so constructed and arranged that it can be readily attached to any ordinary thrashing-machine, its adjustments being also such as to adapt it to any desired rapidity of feed.

Having thus described my invention, what I claim is—

1. The combination of a slotted feed-table with knives projecting through the slots of the table and means for independently reciprocating the table and the knives, substantially as described.

2. The combination of the slotted feed-table and reciprocating knives projecting upward through the slots in the table with a rotating crank-shaft, a pitman-connection between the latter and the table, and a pitman-connection between the said shaft and the knives, substantially as described.

3. The combination of the slotted feed-table and knives projecting upward through the slots therein with independent mechanisms for independently reciprocating and raising and lowering the table and the knives, substantially as described.

4. The combination of the feed-table and the knives with a rotary shaft having cranks of different length, a pitman-connection between the shortest crank and the table, and a pitman-connection between the longest crank and the knives, substantially as described.

5. The combination, in a band-cutter and feeder, of the frame provided with front and rear slide-rests, the feed-table provided at the sides of its front and rear portions with pivoted slides engaging the slide-rests, the knives, and means for reciprocating the table and knives, substantially as described.

6. The combination of a feed-table, a vertical longitudinal partition fixed to one end of the table, the knives located, respectively, at opposite sides of the partition, and means for independently reciprocating the table and knives, substantially as described.

7. The combination of a feed-table provided with pivoted adjustable slides, the frame provided with adjustable slide-rests, the knives, and means for independently reciprocating the table and knives, substantially as described.

8. The combination of the feed-table, means for reciprocating the same, the two knives, and the partition detachably secured at its lower edge directly to the table between the knives and reciprocating with the table, substantially as described.

In testimony whereof I affix my signature in presence of two witnesses.

OLIVER ANDERSON.

Witnesses:
WM. DOBSON,
JAS. S. FIELD.